US012440425B2

(12) United States Patent
Matelo et al.

(10) Patent No.: US 12,440,425 B2
(45) Date of Patent: Oct. 14, 2025

(54) COMPOSITION FOR REMINERALIZING TOOTH ENAMEL

(71) Applicant: OBSCHESTVO S OGRANICHENNOI OTVETSTVENNOSTYU "WDS", Moscow (RU)

(72) Inventors: Svetlana Konstantinovna Matelo, Moskovskaya Oblast (RU); Tatiana Vladimirovna Kupets, Moskovskaya Oblast (RU); Aleksandr Vladimirovich Grosser, Moskovskaya Oblast (RU)

(73) Assignee: OBSCHESTVO S OGRANICHENNOI OTVETSTVENNOSTYU "WDS", Moscow (RU)

( * ) Notice: Subject to any disclaimer, the term of this patent is extended or adjusted under 35 U.S.C. 154(b) by 593 days.

(21) Appl. No.: 17/789,098

(22) PCT Filed: Dec. 26, 2019

(86) PCT No.: PCT/RU2019/001020
§ 371 (c)(1),
(2) Date: Jun. 24, 2022

(87) PCT Pub. No.: WO2021/133191
PCT Pub. Date: Jul. 1, 2021

(65) Prior Publication Data
US 2023/0034815 A1    Feb. 2, 2023

(51) Int. Cl.
*A61K 6/20*    (2020.01)
*A61K 6/60*    (2020.01)
*A61K 6/71*    (2020.01)

(52) U.S. Cl.
CPC .............. *A61K 6/20* (2020.01); *A61K 6/60* (2020.01); *A61K 6/71* (2020.01)

(58) Field of Classification Search
CPC ... A61K 6/20; A61K 6/60; A61K 6/71; A61K 6/30; A61K 6/70; A61K 8/20; A61K 8/55; A61K 8/604; A61K 8/731; A61K 8/737; A61K 8/86; A61K 6/69; A61K 8/042; A61K 8/345; A61K 9/06; A61P 1/02; A61Q 11/00
See application file for complete search history.

(56) References Cited

FOREIGN PATENT DOCUMENTS

| EA | 011254 B1 | 8/2009 | |
|---|---|---|---|
| RU | 2311168 C1 | 11/2007 | |
| WO | WO-2009099350 A1 * | 8/2009 | ............. A61K 8/042 |

OTHER PUBLICATIONS

PCT International Search Report and Written Opinion for PCT Patent Application No. PCT/RU2019/001020 dated Oct. 1, 2020. 10 Pages.

* cited by examiner

*Primary Examiner* — Robert A Wax
*Assistant Examiner* — Quanglong N Truong
(74) *Attorney, Agent, or Firm* — MCANDREWS HELD & MALLOY, LTD

(57) ABSTRACT

The invention relates to dentistry, and more particularly to a novel agent in the form of a gel for the treatment and/or prophylaxis of conditions characterized by loss of minerals and salts front tooth enamel. The claimed agent, provided in gel foam, for the treatment and/or prophylaxis of conditions characterized by loss of minerals and salts from tooth enamel contains the following ingredients: 19 wt % glycerin, 10 wt % xylitol 2.3 wt % hydroxyethyl cellulose, 0.09 wt % guar gum, 1.5 wt % calcium glycerophosphate, 0.12 wt % magnesium chloride, 0.9 wt % non-ionic surfactant, 0.24 wt % preservative, 0.04 wt % flavouring agent, she remainder water. The claimed agent provides effective treatment and prophylaxis of the demineralization/hypomineralization of dental tissue, mild forms of fluorosis, and the adverse consequences thereof.

17 Claims, No Drawings

COMPOSITION FOR REMINERALIZING TOOTH ENAMEL

CROSS-REFERENCE TO RELATED APPLICATIONS

The present application is a National Phase Entry of PCT International Application No. PCT/RU2019/001020, which was filed on Dec. 26, 2019, which is herein incorporated by reference in its entirety.

The invention relates to dentistry, and more particularly to a novel composition or composition in the form of a gel for the treatment and/or prevention of conditions or diseases (disorders) characterized by the loss of minerals and salts from the teeth enamel, use thereof and method of treatment using thereof.

Tooth enamel is a dental tissue which carries out a protective function. Enamel contains 96-97% mineral salts and 3-4% organic substances. The process of removing minerals from enamel is called «demineralization».

The causes of demineralization may be improper nutrition, characterized by the lack of vitamins and minerals in the diet or the presence of a large amount of fruit acids therein; mechanical damage to the dental tissue, too frequent or unprofessional whitening; bacterial tooth damage. As a result of demineralization, undesirable conditions occur, characterized by the fact that the tooth enamel changes in color, becomes porous and rough, and the formation of chips is possible. Teeth become sensitive, carious cavities occur.

Natural remineralization of the tooth surface is carried out due to the saliva action: it provides cleansing of the oral cavity from food residues, the buffering properties of saliva provide its ability to neutralize the action of food acids to the limit. In addition, saliva contains the initiators of remineralization: calcium, fluorine and phosphate ions.

Despite this, natural mineralization is often not enough, because saliva may not have sufficient mineralizing potential to overcome an adverse effect of demineralization factors (for example, a significant amount of easily fermentable carbohydrates), therefore, the use of additional compositions is required to restore enamel.

A study by J. A. Kaidonis et al., J Dent Res, 1998 indicates that the best remineralizing effect is provided by medicaments containing fluorine and calcium ions.

Favorable clinical results in the treatment of dental hard tissue erosion were obtained after treatment with solutions of 10% calcium gluconate and 2% sodium fluoride. At the same time, a new layer of crystals forms on the surface of the tooth in the area of the defect. Obviously, the use of calcium and fluoride medicaments stimulates the processes of remineralization in the affected areas of the teeth. The resulting crystalline layer adsorbs organic substances, forming a pellicle that protects the tooth surface from various irritants. The affected area thickens, which prevents the spread of the defect (P. A. Leus, Non-carious diseases of the dental hard tissues. Educational and methodical manual, Minsk, BSMU, 2008).

An example of a composition containing both calcium ions and fluoride ions known from the application RU2003101428 is a topical composition for the prevention and treatment of tooth decay, dental hyperesthesia in the form of a biocompatible polymer film made of hydrophobic and hydrophilic layers, comprising a source of fluorions, an antimicrobial component, calcium compounds, phosphorus-containing compounds and auxiliary substances.

Dental gel according to patent RU2677231 is characterized by the fact that it contains hydroxyapatite, fluorohydroxyapatite and sodium fluoride.

A composition for the treatment of periodontal diseases, which additionally has a remineralizing effect, according to patent RU2361600, contains dry extract of black currant leaves as active components of a substance of vegetable origin, as well as water, glycerin, a water-soluble cellulose derivative, calcium glycerophosphate, sodium fluoride, propylparaben sodium salt, fructose, peppermint oil.

Despite the fact that fluoride-containing toothpastes and gels are popular, in practice the remineralizing effect of their use is insignificant, because they reveal their properties mainly on the enamel surface. In addition, such compositions do not cope with deep areas of demineralization, which are called tooth decay in the white spot stage, for example, occurred during and after orthodontic treatment with non-removable devices.

It is known that in 50-88% of patients undergoing orthodontic treatment using bracket systems, chalky spots develop on at least one tooth during the treatment. Area of demineralization usually occur on the first molars, lateral incisors of the upper jaw and canines of the lower jaw. Injuries are most often occur around the lock (bracket) adjacent to the vestibular surface of the tooth. The quality of individual oral hygiene in orthodontic patients largely determines the risk of the formation of area of initial carious lesions.

The most important condition for stopping the development of tooth decay is careful regular removal of biofilm in the affected area, which allows saliva minerals to act on the area of demineralization.

At the same time, a number of studies have shown that carrying out routine oral care procedures using fluoride-containing toothpastes does not allow achieving the necessary degree of surface cleaning and does not have a significant effect on chalky spots.

An additional disadvantage of the use of fluoride in the composition of remineralizing compositions is the possibility of the development of dental fluorosis at an early age during and after their use, in case of improper use of fluoride-containing compositions. There may be an adverse effect of fluoride on the thyroid gland, skeleton, and urinary system, as well as CIS (IQ level).

Dental fluorosis is a disease that develops when an excessive amount of fluoride compounds enters the body during the formation of teeth and is characterized by the occurrence of chalky and/or pigmented spots, as well as the destruction of enamel Domestic and foreign researchers note a high prevalence of dental fluorosis on all continents. The clinical picture of dental fluorosis, as well as its intensity, depend not only on the amount of fluoride compounds entering the body from various sources, but also on the time of their toxic effects on the body, especially during active growth, and the degree of individual susceptibility to fluoride compounds.

It is noted that this type of pathology is diagnosed on permanent teeth more often than on temporary ones, and fluorotic lesions can be observed already at the time of their eruption.

A number of authors believe that the degree of adverse consequences of this disease and concern of patients with dental fluorosis depends on the severity of clinical implications, on belonging to a particular age group, as well as on psychological characteristics. Often, in case of a mild form of pathology, only a dissatisfaction in aesthetic perception is appropriate for patients. While severe lesions of fluorosis expand the range of complaints of the patient, and, in addition to aesthetic problems, others are added due to the damage (destruction) of dental hard tissues: the occurrence of pain syndrome when exposed to temperature irritants, chipping of enamel, increased dental attrition. In conditions of unsatisfactory individual oral hygiene, joining of tooth decay to the existing pathology is possible.

Mild forms of fluorosis are accompanied by reversible processes of violation of enamel mineralization, unlike severe forms. Severe forms of dental fluorosis (erosive, destructive) are characterized by the occurrence of defects in the dental hard tissues, an increase in their fragility, and can lead to severe attrition of enamel and even dentin, to chips of hard tissues. According to the observations of a number of researchers in the same patient, it is possible to register clinical signs inherent to several forms of this disease: chalky and pigmented spots, spot and merged erosions, attrited and chipped enamel.

Fluoride compounds are widely spread in nature and are an integral part of the tissues of human organs. These compounds can enter the atmosphere from waste and emissions of the aluminum and chemical industries. Due to the development of industrial centers, fluoride compounds turn out to be one of the most frequent pollutants of water, soil, and air. When drinking contaminated water and food, 75-90% of these compounds from its total number enter the human body. They invade the human body through the gastrointestinal tract and are adsorbed from the air by the lungs, skin, and mucous membranes. It is assumed that the accumulation of fluorides in human tissues and organs proceeds unevenly. The maximum number of them is observed in the bones and surface layers of tooth enamel (up to 100 microns thick), and the highest adsorption is observed during the entire period of active growth in childhood and adolescence.

It is known that the optimal concentration of fluorides in drinking water is 0.7-1.0 mg/l, which results in an anticariotic effect. With an increase in the concentration up to 1.2 mg/l or more, signs of fluoride intoxication occur in the body, the most rapidly developing of which is dental fluorosis.

It is known that an increase in the concentration of fluorides leads to a decrease in the activity of phosphatases and, consequently, to a violation of the mineralization of tooth enamel. However, living in an endemic region is not an unambiguous factor leading to the occurrence of dental fluorosis. The prevalence and intensity of this pathology are caused not only by the quantitative content of fluorides in drinking water, but also by a complex of other factors, such as: the period of residence of the child in the area of endemia (especially during the active growth of the body and mineralization of tooth enamel); the use of fluoride-containing toothpastes; the nature of consumed nutrition and food rich in fluoride compounds; as well as the individual sensitivity of the body to fluoride intoxication.

Since the preventive programs have been adopted currently, which are aimed to reduce the disease incidence of tooth decay among the children's population, in which the widespread use of fluoride compounds is recommended, it should be noted that this type of prevention is often carried out without taking into account the total intake of fluorides into the body and the individual characteristics of their susceptibility by the child's body, which incurs the development of clinical picture of fluorosis as a result of uncontrolled and widespread use of such medicaments.

Thus, there are reasonable assumptions that a violation of mineral metabolism is the main pathogenetic factor of intoxication caused by a high concentration of fluorides; and it affects, first of all, highly mineralized tissues, especially enamel and dentin of teeth.

Some authors state that the decrease of the calcium content in the enamel and dentine of fluorotic teeth in comparison with healthy teeth directly depends on the severity of this pathology. There is also a greater propensity of tooth enamel having signs of fluorosis to fractures and attrition compared to healthy teeth.

In an attempt to solve the problem of demineralization and at the same time exclude the occurrence of fluorosis and other adverse conditions remineralizing compositions have been created which do not contain fluorinated components in their composition.

An example of such composition is a composition for remineralization of dental hard tissues according to patent RU2627624, which contains hydroxyapatite of a high degree of purification with a particle size of 20×150 nm as an active component and polyethylene oxides 1500 and 400 which form the basis of the product. The authors of the invention according to this patent indicate a better remineralizing effect of the composition disclosed in the patent compared to the fluorine-containing composition.

The composition for the prevention of oral diseases in the form of a toothpaste with a remineralizing effect, disclosed in patent RU2293551, contains glycerin, silicon dioxide, calcium glycerophosphate, methylparaben, propylparaben, titanium dioxide, fragrance, sodium saccharinate, sodium lauryl sulfate or alkylamidobetaine, drinking water, as well as the proteolytic enzyme bromelain obtained from pineapple stalks, natural sweetener xylitol, xanthan gum and magnesium chloride or magnesium glycerophosphate.

The materials of these patents do not contain information on the possibility of use the compositions they protect for prevention and treatment of complicated cases requiring remineralization, in particular, those associated with long-term orthodontic treatment, as well as the possibility of correcting the external manifestations of fluorosis.

The prototype of the present invention is a composition in the form of a gel for remineralization of dental tissues according to patent EA011254, which contains the following active components by weight %: xylitol 2-25, calcium glycerophosphate 0.1-3.0, a source of magnesium ions 0.01-0.50 and guar gum 0.03-0.30, as well as inert components used for the preparation of dental gels.

This composition is used to prevent tooth decay, treat non-carious lesions, including dental hyperesthesia, and to improve the appearance (color and shine) of teeth.

At the same time, the composition disclosed in the patent is not used for the treatment and/or prevention of conditions and disorders characterized by the loss of minerals and salts from tooth enamel.

The authors of the present invention solve the problem of rapid effective treatment and/or prevention of undesirable conditions characterized by the loss of minerals and salts from tooth enamel by creating a composition in the form of a gel (composition) shown in Table 1:

TABLE 1

| Components of the composition | Content, % by weight Composition |
|---|---|
| Glycerin | from 18 to 20 |
| Xylitol | from 9.5 to 10.5 |
| Hydroxyethyl cellulose | 2.3 |
| Guar gum | 0.09 |

TABLE 1-continued

| Components of the composition | Content, % by weight Composition |
|---|---|
| Calcium glycerophosphate | from 1.4 to 1.6 |
| Magnesium chloride | 0.12 |
| Nonionic surfactant | from 0.85 to 0.95 |
| Preservative | 0.24 |
| Flavouring agent | 0.04 |
| Water | up to 100 |

The problem is also solved by the use of such a gel for the treatment and/or prevention of conditions characterized by the loss of minerals and salts from the teeth enamel, as well as by the proposed method of treatment using such composition in the form of a gel.

The problem is also solved by a method of treatment and/or prevention of conditions characterized by the loss of minerals and salts from the enamel of teeth, providing for the application of an effective amount of remineralizing composition to the surface of the teeth, characterized in that the composition according to the invention is used as a remineralizing composition, and this composition is applied 1-3 times a day, in sufficient quantity, in general, ensuring its presence on a significant or a larger surface of the teeth for at least 3 minutes, preferably at least 7 minutes, more preferably 15 minutes, even more preferably at least 1 hour to achieve the greatest effect.

The technical result manifested when using the group of inventions is a fast, effective and practically convenient treatment or prevention of conditions characterized by the loss of minerals and salts from tooth enamel. The convenience of treatment ensures the patient's adherence to such therapy, which is essential for achieving the goals of treatment or prevention.

Conditions requiring prevention or treatment include demineralization, hypomineralization of teeth, the formation of carious spots on the teeth enamel which occur during or after orthodontic treatment with non-removable devices, the occurrence and development of dental fluorosis characterized by the occurrence of chalky, white or pigmented spots, destruction of enamel.

In addition to the advantages listed above, the claimed gel is characterized by excellent organoleptic properties and aesthetically pleasing appearance thereof, which is important to ensure the patient's adherence to the treatment and prevention with this composition.

The proposed composition does not contain fluorinating agents, the remineralizing effect is provided by the presence of active ingredients, including xylitol, calcium glycerophosphate, magnesium chloride and guar gum. The claimed composition surpasses fluorinated analogues in efficiency, is characterized in toxicological safety and is preferably recommended for use in conditions where the water used in everyday life does not exclude exceeding the level of fluorinated components or the ecological situation does not exclude exceeding fluorinated substances.

The following explanations are not restrictive, and are aimed to a more detailed description of the invention and regimens of use thereof.

The present invention is for the prevention and treatment of conditions characterized by the loss of minerals and salts from tooth enamel. Such conditions include demineralization, hypomineralization of teeth, fluorosis, especially fluorosis in mild forms, a spot being formed or already formed on the enamel, in particular, a spot characterized by the subsequent occurrence of a carious cavity on the enamel, which arose during or after orthodontic treatment with non-removable devices, further requiring the use of filling materials or veneers.

More specifically the present invention in one of the contexts is for the prevention of the formation and/or elimination of the occurred chalky, white, pigmented or other spots that occur during or after orthodontic treatment with non-removable devices.

Specific examples of such devices are various bracket systems.

Bracket systems can be made of metal, ceramics, plastic.

Bracket systems are a non-removable retainer, self-ligating braces, invisible braces, etc.

The occurred spot, depending on the severity of the disease, may be characterized by the emergence of a carious cavity on the enamel, the treatment of which may require the use of filling materials or veneers.

The present invention, in another context, is for the prevention of the formation and/or elimination of the occurred chalky, white, pigmented or other spots caused by fluorosis.

The present invention, in another context, is for the prevention of the formation and/or elimination of occurred enamel disorders caused by fluorosis.

The claimed composition may contain auxiliary components, which can be selected from the ones described below, but are not limited to them.

The claimed composition contains a nonionic surfactant, which can be polysorbate-20, PEG-40 hydrogenated castor oil, alkyl polyglycoside.

The claimed composition contains a preservative, which can be methylparaben, sodium methylparaben, phenoxyethanol, benzoic acid, sodium benzoate, potassium sorbate, thymol.

The claimed composition contains a flavouring agent, which can be mint oil, *eucalyptus* oil, geranium oil, orange oil and similar components.

It has been established that the proposed composition in these concentrations is particularly stable when interacting with most types of preservatives and flavouring agents used in the cosmetic industry, which is another practical advantage of it.

Recommended doses and regimens of application of the proposed composition:

For effective remineralization of teeth, it is recommended to apply the claimed composition to the teeth in an amount of 0.5-1.5 grams, 1-2 times a day when used with mouthguards, or up to 5 times a day when used without mouthguards, for 15 days.

For the treatment of defects in the form of spots which have occurred during or after orthodontic treatment on the teeth enamel with non-removable devices, or are a manifestation of fluorosis, it is recommended to apply the claimed composition to the teeth in an amount of 0.5-1.5 grams, 1-2 times a day when used with mouthguards, or up to 5 times a day when used without mouthguards, for 30 days.

The preventive regimens of use of the claimed composition are approximately from ¼ to ½ the amount of composition at a time from the above mentioned, and the same regimen can be applied.

The above-mentioned doses and regimens of application of the composition according to the invention make it possible to achieve the goal of treatment and/or prevention in full.

The described doses are not restrictive and can be changed depending on the degree or complexity of the disease.

The claimed invention is confirmed by the following examples.

EXAMPLE 1. PREPARATION OF THE COMPOSITION ACCORDING TO THE INVENTION

To select the «best» composition, numerous implementation options were consistently tried, and three gel variants were prepared for control comparison (Table 2).

TABLE 2

Variants of compositions for the treatment and/or prevention of conditions characterized by the loss of minerals and salts from tooth enamel.

| | Content, % by weight | | |
|---|---|---|---|
| Components | Composition 1 | Composition 2 | Composition 3 |
| Glycerin | 23 | 19 | 17 |
| Xylitol | 6 | 10 | 12 |
| Hydroxyethyl cellulose | 2.3 | 2.3 | 2.3 |
| Guar gum | 0.05 | 0.09 | 0.22 |
| Calcium glycerophosphate | 0.6 | 1.5 | 1.9 |
| Magnesium chloride | 0.06 | 0.12 | 0.3 |
| Polysorbate-20 | 0.9 | 0.9 | 0.9 |
| Methylparaben | 0.24 | 0.24 | 0.24 |
| Flavouring agent | 0.04 | 0.04 | 0.04 |
| Water | up to 100 | up to 100 | up to 100 |

Compositions in the form of a gel can be prepared using standard techniques.

In this case, the compositions were prepared as follows.

The required amount of water was weighed in a measuring cup, then the water was loaded into a mixer, where the remaining components of the gel were added under normal conditions. The mixture was stirred until a transparent uniform gel solution was formed for 20 minutes. Then the primary packaging was carried out.

EXAMPLE 2. COMPARATIVE CHARACTERISTICS OF CLINICAL INDICATORS OF THE ORAL CAVITY

The clinical indicators of the oral cavity were evaluated in 18 twelve-year-old school students before remineralizing therapy and 15 days after the therapy. The participants were divided into three groups of 6 people in each group. After appropriate training, the school students were given the required number of gels No. 1,2,3, standard mouthguards and toothpastes that do not contain fluoride compounds. Gel applications were carried out by all school students independently for 20 minutes after brushing their teeth, before going to bed. In the experiment, the clinical indicators of the TER-test, the CDERR-test for the intensity of staining (points) and the CDERR-test for the duration of staining (days) were measured.

TER-test, a test for determining enamel resistance (Okushko V. R., Kosareva L. I., 1983), allows us to determine the indicator of acid resistance of enamel and propensity to tooth decay.

The CDERR-test, a clinical assessment of remineralization rate of tooth enamel (Redinova T. L., Leontiev V. K., 1982), allows us to assess the ratio of the processes of de- and remineralization of tooth enamel in the patient's oral cavity.

TABLE 3

Comparative characteristics of clinical indicators of the oral cavity when using gels according to compositions 1, 2, 3.

| Composition No | TER-test | CDERR-test on the intensity of staining (points) | CDERR-test on the duration of staining (days) |
|---|---|---|---|
| No1 before the study | 6.74 ± 0.32 | 12.84 ± 0.92 | 4.04 ± 0.16 |
| No1 after the study | 5.11 ± 0.32 | 8.36 ± 0.52 | 2.97 ± 0.11 |
| No2 before the study | 5.71 ± 0.33 | 15.71 ± 0.76 | 3.21 ± 0.20 |
| No2 after the study | 3.89 ± 0.12 | 8.47 ± 0.60 | 1.92 ± 0.15 |
| No3 before the study | 6.14 ± 0.43 | 16.61 ± 1.46 | 4.31 ± 0.14 |
| No3 after the study | 4.13 ± 0.28 | 8.48 ± 0.54 | 2.51 ± 0.14 |

TABLE 4

The degree of reduction of clinical indicators of the oral cavity when using compositions 1, 2, 3 (%).

| Clinical indicators | Composition 1 | Composition 2 | Composition 3 |
|---|---|---|---|
| TER-test | 24.0 | 31.9 | 33.1 |
| CDERR-test on the intensity of staining (points) | 35.1 | 46.1 | 49.1 |
| CDERR-test on the duration of staining (days) | 26.1 | 39.9 | 41.8 |

Thus, it is shown that composition 2 has a higher efficiency compared to composition 1, a further increase in the concentration of active ingredients does not lead to a significant increase in efficiency, but leads to an increase in the cost of the entire composition.

It should also be noted that the taste of the gel containing more than 10% xylitol may be perceived by some patients as too sweet, i.e. negatively, which may lead to a decrease in the patient's adherence to treatment, due to the patient's unwillingness to use it regularly and reduce the preventive and therapeutic effect. At the same time, a lower content (composition 1) of xylitol is also undesirable due to a decrease in the effectiveness of exposure.

At the same time, as a result of tests, it was also found that patients subjectively perceive the organoleptics of composition 2 better than the one of compositions 1 and 3.

For further study, a gel of composition 2 was selected, as having shown the best results in a comparative study.

EXAMPLE 3. THE EFFECTIVENESS OF THE MEDICAMENT WHEN USED IN PATIENTS WHO HAVE COMPLETED ORTHODONTIC TREATMENT WITH A BRACKET SYSTEM

The effect of the gel according to the «best» composition on the area of enamel demineralization, which persists in the form of chalky or white spots after completion of orthodontic treatment, was studied.

Data collection and processing were carried out in 2018-2019. The condition for inclusion in the study was the presence of chalky or white spots occurred during the wearing of the bracket system or after its removal in patients, as well as the use of toothpaste that does not contain fluorinating agents in the composition thereof.

The study was conducted in three time intervals: 4 weeks, 6 weeks, 8 weeks, and two age groups: 11-15 years, 20-25 years.

All participants of the study were divided into two equal groups.

Half of the study participants (the first group) used a toothpaste that did not contain fluoride compounds, applying it twice a day for at least three minutes.

The other half of the study participants (the second group) used the gel according to the «best» composition, applying it twice a day for 10-12 minutes after brushing their teeth with a paste that does not contain fluorinating agents according to the scheme used in the first group, then the patients put on a mouthguard, and restricted eating and drinking for an hour after applying the gel.

The terms of removal of the bracket system were less than six months, from six months to a year, 1-3 years.

White and chalky spots on the first molars and lateral incisors of the upper jaw were examined. The spots were examined using the diagnostic system DIAGNOcam.

The results of the study showed the following.

No significant changes were found in the patients of the first group who underwent the test for four and six weeks. Patients who underwent the test for 8 weeks had an improvement in the condition of the enamel by 2-3%.

In the group of patients using the gel according to the «best» composition, who removed the bracket system less than six months before treatment and used the gel for 4 weeks, a decrease in the area of the spot was observed by an average of 29.4%, for 6 weeks-42.4% for 8 weeks-43.5%.

In the group of patients using the gel according to the «best» composition, who removed the bracket system less than six months before treatment and used the gel for 4 weeks, a decrease in the area of the spot was observed by an average of 27.9%, for 6 weeks-41.3% for 8 weeks-42.9%.

In the group of patients using the gel according to the «best» composition, who removed the bracket system during 1-3 years before treatment and used the gel for 4 weeks, a decrease in the area of the spot was observed by an average of 27.9%, for 6 weeks-40.1% for 8 weeks-42.6%.

The experience of using the gel in the study participants was positive. They rated the taste of the gel as good (with a fruity note, refreshing), and the consistency as pleasant. The use of the gel made the teeth smoother, cleaner and more radiant. The gel also relieved hypersensitivity, gave fresh breath, facilitated the process of brushing the teeth. Since the gel according to the «best» composition does not contain protein, unlike products based on the amorphous calcium phosphate-phosphopeptide complex from casein, it can be recommended for patients suffering from allergies to cow's milk proteins.

This option of self-care can be recommended to patients already at the beginning of orthodontic treatment or immediately after its completion, when a problem is detected after removing the device. A positive result of treatment was achieved, including in patients who were disturbed by white spots for many years after the completion of treatment with bracket systems. The period of this study, 4-8 weeks, can be considered as sufficient for a reliable effect of remineralization and elimination of the adverse consequences thereof.

EXAMPLE 4. USE OF THE MEDICAMENT IN PATIENTS WITH FLUOROSIS

The study aimed to determine the therapeutic and preventive effectiveness of the gel according to the «best» composition was conducted for six months. 30 people with a mild form of dental fluorosis and 30 people without manifestations of pathology of dental hard tissues in the form of fluorosis were selected for the study.

The subjects were divided into groups of 15 people each.

The first group carried out professional oral hygiene using a toothpaste that does not contain fluorinating agents in combination with the administration of vitamin and mineral complex;

The second group carried out professional oral hygiene using a toothpaste that does not contain fluorinating agents in combination with gel according to the «best» composition as applications using an individual mouthguard for 20 minutes daily, patients were asked not to eat or drink for 1 hour after applications;

The third group carried out professional oral hygiene using a toothpaste that does not contain fluorinating agents in combination with teeth whitening using an active gel containing 16% hydrogen peroxide;

The fourth group is a control group without manifestations of fluorosis. The group carried out professional oral hygiene using a toothpaste that does not contain fluorinating agents.

To carry out the clinical part of the study, different materials were used, which characterized by the qualitative composition thereof, as well as by the nature and direction of action in order to solve the selected problem associated with dental discoloritis caused by mild form of dental fluorosis.

The effectiveness was evaluated according to the standard methodology proposed by V. A. Drozhzhina and Yu. A. Fedorov (1997). Namely, the cleaned and thoroughly dried vestibular surface of the tooth was treated in the area of chalky, fluorotic spots of the four upper incisors with a cotton swab moistened with a 5% alcohol solution of iodine, which has a high ability to penetrate into the hard tissues of the tooth. The results of the staining degree were evaluated on a scale:

1 point—no staining;
2 points—light yellow staining;
3 points—light brown staining or yellow staining;
4 points—dark brown staining.

The calculation of the remineralization index of each individual patient was carried out by summation the indicators of staining of fluorotic spots to the number of teeth examined.

Results of the Study:

The First Group:

TABLE 5

Dynamics of clinical and laboratory indicators in patients of the first group.

| | Remineralization index |
|---|---|
| November 2018 | 3.5 |
| April 2019 | 3.1 |

According to the results of treatment, there is a significant improvement in the condition of the enamel.

The Second Group:

TABLE 6

Dynamics of clinical and laboratory indicators in patients of group II.

| | Remineralization index |
|---|---|
| November 2018 | 3.4 |
| April 2019 | 1.0 |

According to the results of treatment, there is a significant improvement in the condition of the enamel.

The Third Group:

TABLE 7

Dynamics of clinical and laboratory indicators in patients of the third group.

| | Remineralization index |
|---|---|
| November 2018 | 3.4 |
| April 2019 | 2.6 |

Control Group:

TABLE 8

Dynamics of clinical and laboratory indicators in patients of the control group.

| | Remineralization index |
|---|---|
| November 2018 | 1.0 |
| February 2019 | 1.0 |

Thus, it can be stated that the existing recommended method of bleaching the pigmented enamel using 16% peroxide gels, as well as administration of a vitamin-mineral complex, solves the problem only partially, while the gel (composition) proposed by the present invention, when applied according to the proposed method, provides the maximum effect of restoring the mineral content of tooth enamel in the case of mild forms of fluorosis.

The invention claimed is:

1. A composition for the treatment and/or prevention of conditions characterized by the loss of minerals and salts from the teeth enamel selected from the following: demineralization, hypomineralization of teeth, fluorosis, a spot being formed or already formed on the enamel, which is characterized by the subsequent occurrence of a carious cavity on the enamel, which arose during or after orthodontic treatment with non-removable devices, further requiring the use of filling materials or veneers, in the form of a gel, characterized in that it comprises the following ingredients—wt. %: Glycerin—from 18 to 20, Xylitol—from 9.5 to 10.5, Hydroxyethyl cellulose—2.3, Guar gum—0.09, Calcium glycerophosphate—from 1.4 to 1.6, Magnesium chloride—0.12, Nonionic surfactant—0.9, Preservative—0.24, Flavouring agent—0.04, Water up to 100.

2. The composition according to claim 1, characterized in that it comprises the following ingredients, wt. %: Glycerin—19, Xylitol—10, Hydroxyethyl cellulose—2.3, Guar gum—0.09, Calcium glycerophosphate—1.5, Magnesium chloride—0.12, Nonionic surfactant—0.9, Preservative—0.24, Flavouring agent—0.04, water up to 100.

3. The composition according to claim 1, wherein the spot is a chalky, white or pigmented spot.

4. The composition according to claim 1, wherein a nonionic surfactant is polysorbate-20 or PEG-40 hydrogenated castor oil, or alkyl polyglycoside.

5. The composition according to claim 1, wherein a preservative is one of the substances selected from the group: methylparaben, sodium methylparaben, phenoxyethanol, benzoic acid, sodium benzoate, potassium sorbate, thymol.

6. A method for using the composition according to claim 1 for the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth.

7. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 1, wherein the composition is applied 1-3 times a day, ensuring its presence on a surface of the teeth for at least 3 minutes.

8. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 1, wherein the composition is applied 1-3 times a day, ensuring its presence on a surface of the teeth for at least 7 minutes.

9. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 1, wherein the composition is applied 1-3 times a day, ensuring its presence on a surface of the teeth for at least 15 minutes.

10. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 1, wherein the composition is applied 1-3 times a day, ensuring its presence on a surface of the teeth for at least 1 hour.

11. The composition according to claim 2, wherein a nonionic surfactant is polysorbate-20 or PEG-40 hydrogenated castor oil, or alkyl polyglycoside.

12. The composition according to claim 2, wherein a preservative is one of the substances selected from the group: methylparaben, sodium methylparaben, phenoxyethanol, benzoic acid, sodium benzoate, potassium sorbate, thymol.

13. A method for using the composition according to claim 2 for the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth.

14. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 2, wherein the composition is applied 1-3 times a day, ensuring its presence on a surface of the teeth for at least 3 minutes.

15. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 2, wherein the composition is applied 1-3 times a day, ensuring its presence on a surface of the teeth for at least 7 minutes.

16. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 2, wherein the composition is applied 1-3 times a day, ensuring its presence on a surface of the teeth for at least 15 minutes.

17. A method of the treatment and/or prevention of conditions characterized by the loss of minerals and salts from the teeth enamel selected from the following: demineralization, hypomineralization of teeth, fluorosis, a spot being formed or already formed on the enamel, characterized by the subsequent occurrence of a carious cavity on the enamel, which arose during or after orthodontic treatment with non-removable devices, further requiring the use of filling materials or veneers, providing for the application of an effective amount of remineralizing composition to the surface of the teeth, characterized in that a remineralizing composition is used according to claim 2, wherein the composition is applied 1-3 times a day, ensuring its presence on a surface of the teeth for at least 1 hour.

\* \* \* \* \*